United States Patent
Balk et al.

(10) Patent No.: US 8,876,462 B2
(45) Date of Patent: Nov. 4, 2014

(54) SYSTEM OF CONTRA-ROTATING PROPELLERS DRIVEN BY A PLANETARY GEAR TRAIN PROVIDING A BALANCED DISTRIBUTION OF TORQUE BETWEEN THE TWO PROPELLERS

(75) Inventors: Wouter Balk, Melun (FR); Gilles Alain Charier, La Grande Paroisse (FR); Francois Gallet, Paris (FR)

(73) Assignee: Snecma, Paris (FR)

( * ) Notice: Subject to any disclaimer, the term of this patent is extended or adjusted under 35 U.S.C. 154(b) by 747 days.

(21) Appl. No.: 13/139,539

(22) PCT Filed: Dec. 17, 2009

(86) PCT No.: PCT/EP2009/067446
§ 371 (c)(1),
(2), (4) Date: Jun. 14, 2011

(87) PCT Pub. No.: WO2010/070066
PCT Pub. Date: Jun. 24, 2010

(65) Prior Publication Data
US 2011/0243735 A1  Oct. 6, 2011

(30) Foreign Application Priority Data
Dec. 19, 2008  (FR) ...................................... 08 58822

(51) Int. Cl.
*F01D 1/26* (2006.01)
*F02C 3/067* (2006.01)
*F02K 3/072* (2006.01)
*F02C 7/36* (2006.01)
*B64C 11/48* (2006.01)

(52) U.S. Cl.
CPC ....... *F02K 3/072* (2013.01); *F05D 2260/40311* (2013.01); *Y02T 50/671* (2013.01); *F02C 3/067* (2013.01); *Y02T 50/66* (2013.01); *F02C 7/36* (2013.01); *B64C 11/48* (2013.01); *F05D 2260/96* (2013.01)
USPC ................................. 415/69; 415/70; 416/128

(58) Field of Classification Search
USPC .......... 415/60, 65, 66, 69, 70, 122.1; 416/128, 416/129, 198 R, 198 A, 170 R, 201 R
See application file for complete search history.

(56) References Cited

U.S. PATENT DOCUMENTS 2,478,206 A * 8/1949 Redding ...................... 60/226.1
2,526,409 A 10/1950 Price
(Continued)

FOREIGN PATENT DOCUMENTS

| DE | 87 13 745 | 3/1988 |
| DE | 39 33 776 | 4/1991 |
| GB | 586 557 | 3/1947 |

OTHER PUBLICATIONS

International Search Report issued Feb. 18, 2010 in PCT/EP09/067446 filed Dec. 17, 2009.
(Continued)

*Primary Examiner* — Edward Look
*Assistant Examiner* — Aaron R Eastman
(74) *Attorney, Agent, or Firm* — Oblon, Spivak, McClelland, Maier & Neustadt, L.L.P.

(57) ABSTRACT

A system of contra-rotating propellers for an aircraft turbomachine, including: a free power turbine including a first rotor; first and second propellers; and a mechanical transmission system including a planetary gear train fitted with a sun gear driven by the rotor, at least one planet gear driving the first propeller, and a ring driving the second propeller. The free power turbine also includes a second rotor that is contra-rotating relative to the first rotor, and rotating the ring.

9 Claims, 3 Drawing Sheets

(56) References Cited

U.S. PATENT DOCUMENTS

Figure 1:
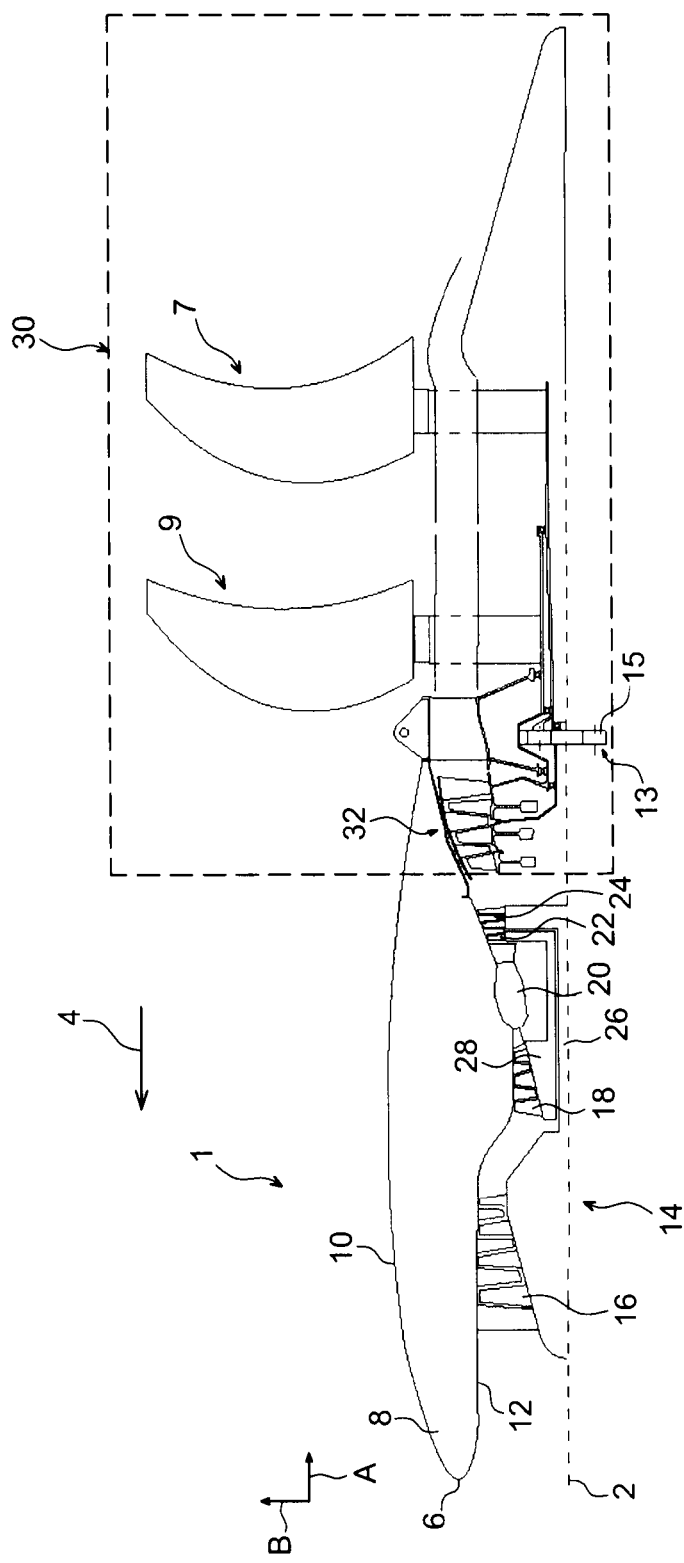

| | | | |
|---|---|---|---|
| 4,817,382 A * | 4/1989 | Rudolph et al. | 60/268 |
| 4,936,746 A * | 6/1990 | Mayo et al. | 416/46 |
| 4,976,102 A * | 12/1990 | Taylor | 60/226.1 |
| 5,010,729 A * | 4/1991 | Adamson et al. | 60/226.1 |
| 5,054,998 A * | 10/1991 | Davenport | 416/1 |
| 5,079,916 A * | 1/1992 | Johnson | 60/268 |
| 5,154,372 A * | 10/1992 | Hora et al. | 244/62 |
| 7,451,592 B2 * | 11/2008 | Taylor et al. | 60/268 |
| 2006/0093467 A1 * | 5/2006 | Orlando et al. | 415/68 |
| 2008/0020891 A1 * | 1/2008 | Beaven | 475/332 |

OTHER PUBLICATIONS

U.S. Appl. No. 13/520,600, filed Jul. 5, 2012, Balk.
U.S. Appl. No. 13/148,404, filed Aug. 8, 2011, Charier, et al.
U.S. Appl. No. 13/255,389, filed Sep. 8, 2011, Charier, et al.
U.S. Appl. No. 14/164,2874, filed Jan. 27, 2014, Hugon, et al.

* cited by examiner

SYSTEM OF CONTRA-ROTATING PROPELLERS DRIVEN BY A PLANETARY GEAR TRAIN PROVIDING A BALANCED DISTRIBUTION OF TORQUE BETWEEN THE TWO PROPELLERS

TECHNICAL FIELD

The present invention relates, generally, to a system of contra-rotating propellers, for an aircraft turbomachine.

The invention also concerns a turbomachine for aircraft including such a system of contra-rotating propellers.

The invention preferably applies to aircraft turbomachines, for example of the jet turbine or turboprop engine type. It applies more particularly to turbomachines called "open rotor" turbomachines, within which a free power turbine drives both contra-rotating propellers, directly or indirectly through a mechanical transmission system forming a reduction gear and notably including a planetary gear train. In these systems of contra-rotating propellers, the propellers therefore have no fairing at their outer radial ends.

STATE OF THE PRIOR ART

From the prior art, turbomachines with systems of contra-rotating propellers are indeed known, the propellers of which are driven by a mechanical transmission system, habitually taking the form of a differential reduction gear. This differential reduction gear includes a particular planetary gear train, the sun gear of which is rotated by a rotor of a free power turbine, the planet gear carrier of which drives the first propeller, and the ring of which drives the second propeller. With this regard, it is noted that depending on the position of the contra-rotating propellers relative to the free power turbine which is driving them, the first propeller constitutes the downstream propeller and the second propeller the upstream propeller, or vice versa. Be that as it may, unlike a single planetary gear train, the ring is not fixed, but mobile.

With such a planetary gear train, the two propellers cannot be subject to the same aerodynamic torques. The mechanical balancing equations of the planet gears show that these two torques necessarily have a constant ratio, depending on the geometrical characteristics of the reduction gear. This ratio is necessarily other than a ratio of equality. Indeed, the ratio between the torque C1 applied to the first propeller and the torque C2 applied to the second propeller is expressed as follows:

$$C1/C2=(R+1)/(R-1);$$

where R is the reduction ratio defined by the planetary gear train.

Thus, in order to attain a ratio of torques which is close to equality, it is necessary to increase the reduction ratio R which, however, for questions of mechanical feasibility, cannot be greater than 10. In addition, the increase of the reduction ratio R inevitably leads to an increase of the overall mass of the propeller system, having an adverse effect on the turbomachine.

As a consequence of the unequal ratio between the torques, one of the two propellers will generate a greater gyration of the secondary flow than the other propeller, causing a residual gyration of the output flow, appreciably limiting the propulsion efficiency and increasing deleteriously the acoustic level of the turbomachine. In reality, it is the first propeller driven by the planet gear carrier which always has a greater load in terms of torque.

Moreover, this difference between the two torques also generates an increased stress of the means used for mounting the turbomachine on the aircraft, and these means must accordingly be over-dimensioned to support the extra load which is applied to them.

SUMMARY OF THE INVENTION

The purpose of the invention is therefore to provide at least partially a solution to the disadvantages mentioned above, compared with the embodiments of the prior art.

To accomplish this, the first object of the invention is a system of contra-rotating propellers for aircraft turbomachine, including:

- a free power turbine including a first rotor;
- a first contra-rotating propeller and a second contra-rotating propeller intended to be rotated around a lengthways axis of the propeller system, relative to a stator of this system; and
- a mechanical transmission system including a planetary gear train fitted with a sun gear centred on the said lengthways axis and driven by the said first rotor of the free power turbine, where at least one planet gear engages with the said sun gear, where one or more planet gear carrier(s) drive(s) the said first propeller, together with a ring engaging with each planet gear and driving the said second propeller.

According to the invention, the said free power turbine also includes a second rotor which is contra-rotating relative to the said first rotor, and rotating the said ring.

The invention therefore advantageously seeks to address the torque deficit received by the second propeller by acting such that the latter is partly driven by the second rotor of the free power turbine, via the ring of the planetary gear train. In other words, the torque transmitted to the second propeller by the ring no longer originates solely from the planet gears as was previously the case, but also originates from the second rotor of the power turbine, which therefore takes on a contra-rotating character.

This feature leads to a balance of the two torques transmitted respectively to the two propellers, and the ratio between these two torques is effectively equality. The consequence is, firstly, that both propellers will each generate a roughly identical gyration of the secondary flow, which prevents the deleterious appearance of a residual gyration of the output flow. Thus, the aerodynamic flow is satisfactorily rectified at the output from the propeller system, which procures an improved propulsion efficiency and a reduction of the acoustic level produced.

Furthermore, as a consequence of this balancing of the torques, the means used for mounting the turbomachine on the aircraft are subject to less mechanical stress, and can consequently be of a less costly design in terms of encumbrance and mass.

Moreover, within the contra-rotating free power turbine, the first rotor can rotate less rapidly than in the case of a traditional turbine, whilst preserving the same power delivered at the output of this turbine. This reduction of the rotational speed of the first rotor not only allows its design to be facilitated and simplified, since the centrifugal forces applied to it are lesser, but also enables the reduction ratio conferred by the planetary gear train to be reduced, since the speed of its sun gear, driven by the first rotor, is lower. A substantial gain in terms of mass obviously results from these two advantages.

Moreover, it should be noted that a reduction gear is characterised by mechanical efficiency, implying that a part of the transmitted power is transformed into heat. Given the power of several megawatts supplied by the aircraft turbomachine, this heat is very substantial. These calories are habitually evacuated by means of an oil circuit, and an air-oil exchanger. The installation of this exchanger in the nacelle constitutes a major constraint for the integration of the propulsive assembly, due to its encumbrance, mass and drag. With the planetary gear train implemented according to the invention, part of the power no longer transits through the reduction gear, but is transmitted directly to the second propeller. Consequently, the quantity of calories to be dissipated in the exchanger is lesser, such that the latter can be of smaller dimensions. This therefore has a beneficial effect for the mass, encumbrance and drag of the air-oil exchanger.

The invention is applicable to all turbomachines, and particularly those known as "open rotor" turbomachines. In the latter case the invention applies whether the propeller system is positioned upstream or downstream from the gas generator. In both these cases, within the propeller system, it can be envisaged to position the power turbine upstream or downstream from the contra-rotating propellers. This is also applicable for the position of the planetary gear train with regard to the propellers.

The said first propeller is preferably the downstream propeller, and the said second propeller is the upstream propeller. This specific arrangement is chosen particularly when the propeller system is positioned downstream from the turbomachine's gas generator, i.e. when the turbomachine is of a design producing a propulsion known as a "pusher" design. Naturally, a reverse design could be envisaged, in which the said first propeller would be the upstream propeller, and the said second propeller would be the downstream propeller, without going beyond the scope of the invention. This other solution is chosen particularly when the propeller system is positioned upstream from the turbomachine's gas generator, i.e. when the turbomachine is of a design producing a propulsion known as a "puller" design.

Whatever the envisaged design among those mentioned above, a choice is preferably made such that the said first rotor of the free power turbine, driving the sun gear, is the internal rotor, and the said second rotor of the free power turbine, driving the ring, is the external rotor, although a reverse design could be envisaged, without going beyond the scope of the present invention.

The said planet gear carrier(s) is preferably integral with the said first propeller, and the said ring is integral with the said second propeller and the said second rotor of the free power turbine.

The first and second propellers preferably each have a system for variable adjustment of their blades. In a known manner, these systems are controlled such that the speed of rotation of both propellers is kept roughly constant in operation, whatever the engine speed.

Another object of the invention is a turbomachine for aircraft including a system of contra-rotating propellers as described above, where this turbomachine is, for example, a turboprop engine, but can alternatively be a turbojet with contra-rotating fan. Naturally, in the latter case, the abovementioned mechanical transmission device is intended to move the contra-rotating fan of the turbojet. As mentioned above, the invention preferably applies more particularly to turbomachines called "open rotor" turbomachines, within which a free power turbine drives both contra-rotating propellers, indirectly through a mechanical transmission system forming a reduction gear and notably including a planetary gear train.

Other advantages and characteristics of the invention will appear in the non-restrictive detailed disclosure below.

BRIEF DESCRIPTION OF THE ILLUSTRATIONS

Figure 2:
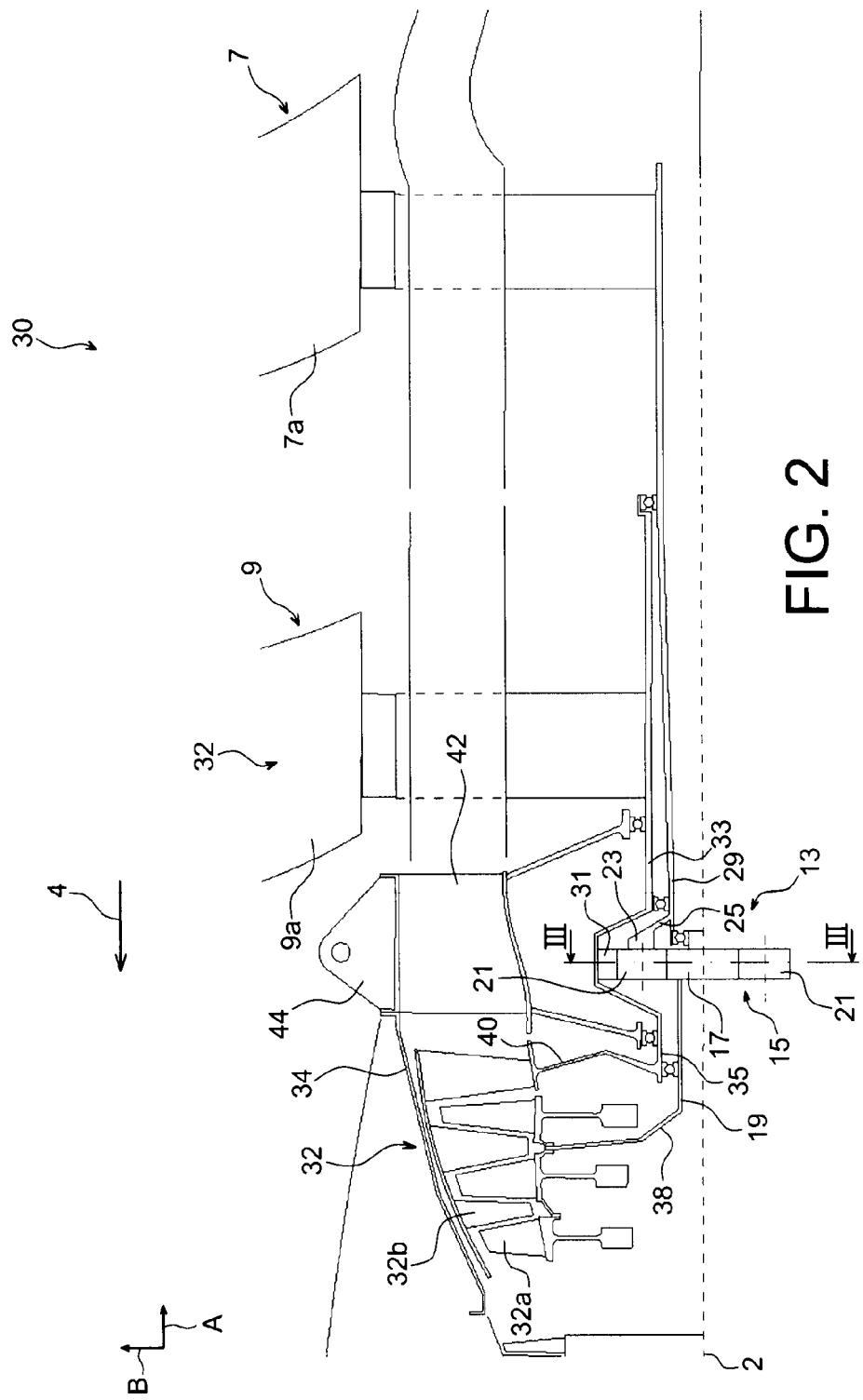
Figure 3:
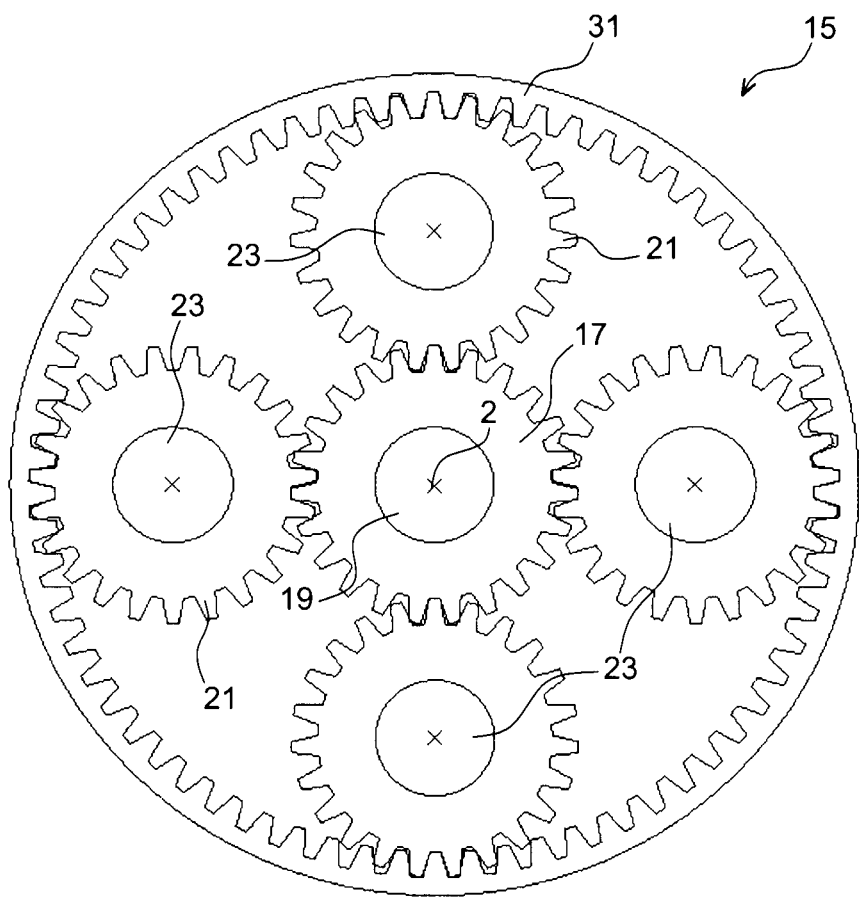

This description will be made with reference to the attached illustrations, among which FIG. 1 represents a schematic lengthways half-section view of a turbomachine for aircraft, according to a preferred embodiment of the present invention;

FIG. 2 represents an enlarged view of the system of contra-rotating propellers fitted to the turbomachine shown in FIG. 1; and FIG. 3 represents a section view taken along line III-III of FIG. 2.

DETAILED ACCOUNT OF PREFERRED EMBODIMENTS

With reference to FIG. 1, a turbomachine 1 of the "open rotor" type according to a preferred embodiment of the present invention can be seen.

In the figures, direction A is the lengthways direction or axial direction, parallel to lengthways axis 2 of the turbomachine. Direction B, for its part, is the radial direction of the turbomachine. In addition, arrow 4 shows the direction of motion of the aircraft under the action of the thrust of turbomachine 1, where this motion direction is contrary to the principal outflow direction of the gases within the turbomachine. The terms "forward", "upstream", "aft" and "downstream" used in the remainder of the description should be considered as relative to the said direction of motion 4.

In the forward part, the turbomachine has an air intake 6 which continues towards the rear through a nacelle 8, where the latter globally includes an external skin 10 and an internal skin 12, both the latter being centred on axis 2 and offset radially one from the other.

The internal skin 12 forms an external radial casing for a gas generator 14, including the traditionally, from forward to aft, a low-pressure compressor 16, a high-pressure compressor 18, a combustion chamber 20, a high-pressure turbine 22 and an intermediate-pressure turbine 24. Compressor 16 and turbine 24 are connected mechanically by a shaft 26, thus forming a low-pressure body, whereas the compressor 18 and the turbine 22 are connected mechanically by the shaft 28, forming a body of higher pressure. Consequently, the gas generator 14 is preferably of traditional design, called a two-spool design.

Downstream from the intermediate-pressure turbine 24 is a system of contra-rotating propellers 30, forming the receiver of the turbomachine.

This system 30 includes a free power turbine 32, forming a low-pressure turbine, and which has the feature that it is contra-rotating. Indeed, with reference more specifically to FIG. 2, it includes a first rotor 32a constituting the internal rotor of the contra-rotating turbine, and a second rotor 32b constituting the external rotor of this turbine, where this second rotor 32b is also called the external drum.

The system of propellers 30 includes a stator or casing 34, centred on the lengthways axis 2 of the system, and notably enclosing the said free power turbine 32. This stator 34 is, in a known manner, intended to be integral with the other casings of the turbomachine. In this regard, it is recommended that the system of propellers 30 is preferably designed such that the propellers have no external radial fairing surrounding them, as is visible in the figures.

In addition, downstream from the contra-rotating turbine 32 the propeller system 30 includes a first propeller 7 or downstream propeller, supporting blades 7a. In analogous fashion, the system 30 includes a second propeller 9 or upstream propeller, supporting blades 9a. Thus, the propellers 7 and 9 are offset relative to one another in direction 4, and both are located downstream from the free turbine 32.

Both propellers 7 and 9 are intended to rotate in opposite directions around axis 2 on which they are centred, and the rotations occur relative to the stator 34, which remains immobile.

For the rotational drive of these two propellers 7 and 9, a mechanical transmission system 13, forming a reduction gear and notably including a planetary gear train 15 is used.

With reference to FIGS. 2 and 3, the drive 15 is fitted with a sun gear 17 centred on the lengthways axis 2, and supported by a sun gear shaft 19 having the same axis, and coupled securely upstream with the first rotor 32a, by means of a flange 38. Thus, rotor 32a directly rotates the sun gear 17, the latter taking the form of an externally toothed wheel.

The drive 15 also includes a planet gear 21, and preferably several of these, as is visible in FIG. 3, where each of them engages with the sun gear 17. Each planet gear 21 is supported by a planet gear shaft 23 with an axis which is eccentric relative to axis 2, and which takes the form of an externally toothed wheel.

In addition, drive 15 is fitted with a planet gear carrier 25 centred on the lengthways axis 2, and supporting rotationally each of the planet gears 21, through the shafts 23, respectively. The planet gear carrier 25 is supported by a planet gear carrier shaft 29 having the same axis, which is integral with the first propeller 7, as is visible in FIG. 2, such that it is able to rotate it directly.

Lastly, drive 15 has a ring 31 centred on the axis 2 and supported by a ring shaft 33 of the same axis, and this ring 31 engages with each planet gear 21. Shaft 33 extends downstream and is integral with the second propeller 9, such that it is able to rotate it directly. For example, this shaft 33 is located around the shaft of the planet gear carrier 29 with which it is concentric, as shown in the figures.

The ring 31, taking the form of an internally toothed wheel, has the additional feature that it is supported by another ring shaft 35, having the same axis, and extending, for its part, in an upstream direction. This ring shaft 35, positioned around the sun gear shaft 19 with which it is concentric, is coupled securely with the second rotor 32b by means of a flange 40. Thus, rotor 32b also participates directly in the driving of the ring 31, and therefore in the driving of the upstream propeller 9. This enables a ratio of equality to be obtained between the torques transmitted respectively to the downstream propeller 7 and to the upstream propeller 9, so as to obtain an improved efficiency of the turbomachine.

Finally, it should be noted that in this preferred embodiment, in which each propeller is fitted with a system for variable adjustment of its blades, the planetary gear train 15 is positioned perpendicular to and within a casing 42 separating the contra-rotating free power turbine 32 and the propellers 7, 9. This casing 42, also called the exhaust casing, or again the "static frame", supports an engine attachment 44 intended to allow the turbomachine to be mounted on to the structure of the aircraft.

Naturally, various modifications can be made by the skilled man in the art to the invention which has just been described, solely as non-restrictive examples.

The invention claimed is:

1. A system of contra-rotating propellers for aircraft turbomachine, comprising:
   a free power turbine including a first rotor;
   a first contra-rotating propeller and a second contra-rotating propeller configured to be rotated around a lengthways axis of the propeller system, relative to a stator of the system; and
   a mechanical transmission system including a planetary gear train fitted with a sun gear centered on a lengthways axis and driven by the first rotor of the free power turbine, wherein at least one planet gear engages with the sun gear, wherein at least one planet gear carrier drives the first propeller, together with a ring engaging with each planet gear and driving the second propeller,
   wherein the free power turbine further includes a second rotor that is contra-rotating relative to the first rotor, and rotating the ring.

2. A system of contra-rotating propellers according to claim 1, wherein the first propeller is a downstream propeller, and the second propeller is an upstream propeller.

3. A system of contra-rotating propellers according to claim 1, wherein the first rotor of the free power turbine is an internal rotor, and the second rotor of the free power turbine is an external rotor.

4. A system of contra-rotating propellers according to claim 1, wherein the at least one planet gear carrier is integral with the first propeller, and the ring is integral with the second propeller and the second rotor of the free power turbine.

5. A turbomachine for an aircraft including a system of contra-rotating propellers according to claim 1.

6. A turbomachine according to claim 5, which is an open rotor turbomachine.

7. A system of contra-rotating propellers according to claim 1, wherein the at least one planet gear carrier is supported by a planet gear carrier shaft which is integral with the first propeller, and the ring is supported by a first ring shaft extending in a downstream direction and being integral with the second propeller and is supported by a second ring shaft extending in an upstream direction and being coupled with the second rotor, the first ring shaft being concentric around the planet gear carrier shaft.

8. A system of contra-rotating propellers according to claim 7, wherein the second ring shaft is concentric around a sun gear shaft which supports the sun gear and which is coupled upstream with the first rotor.

9. A system of contra-rotating propellers according to claim 7, wherein the planet gear carrier shaft and the first and second ring shafts are centered on the lengthways axis.

\* \* \* \* \*